Patented Apr. 9, 1929.

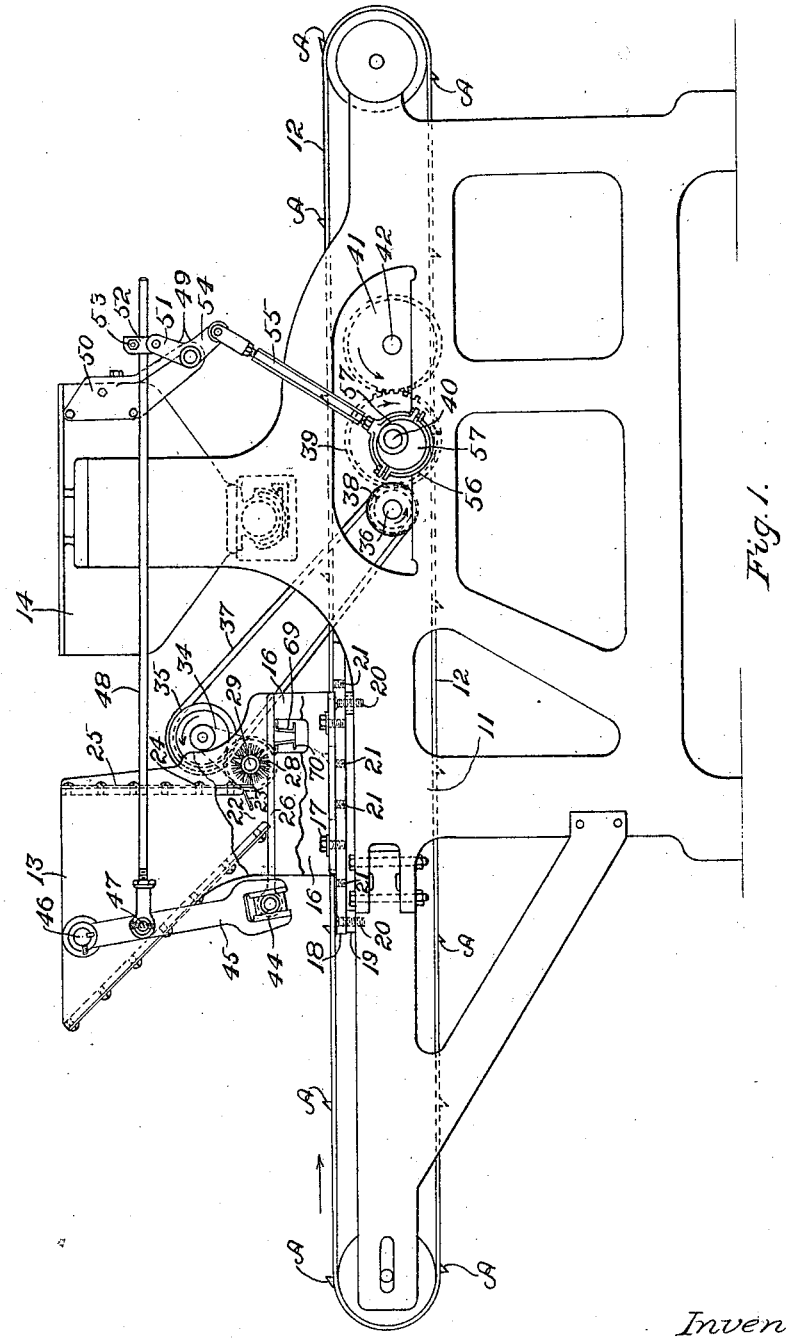

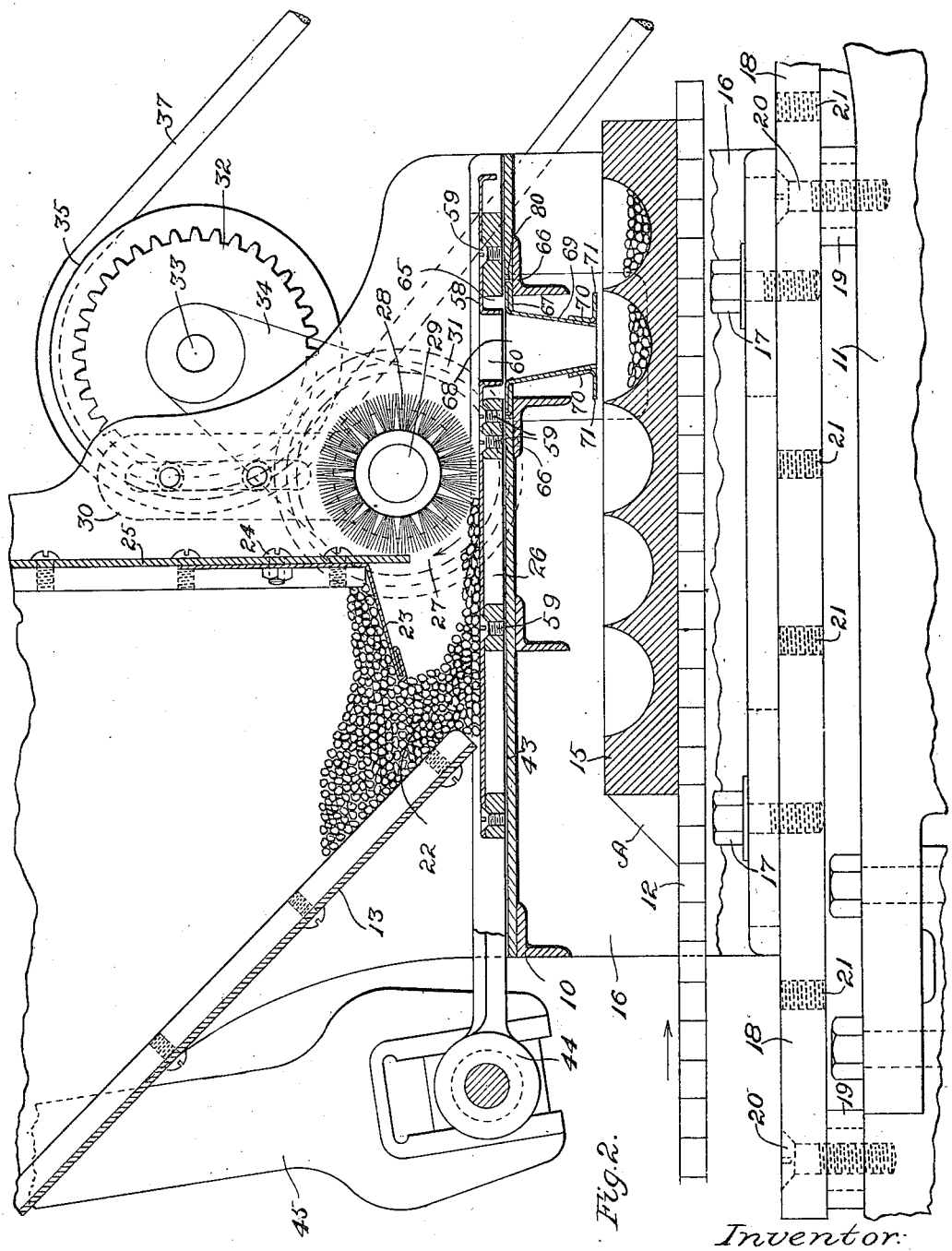

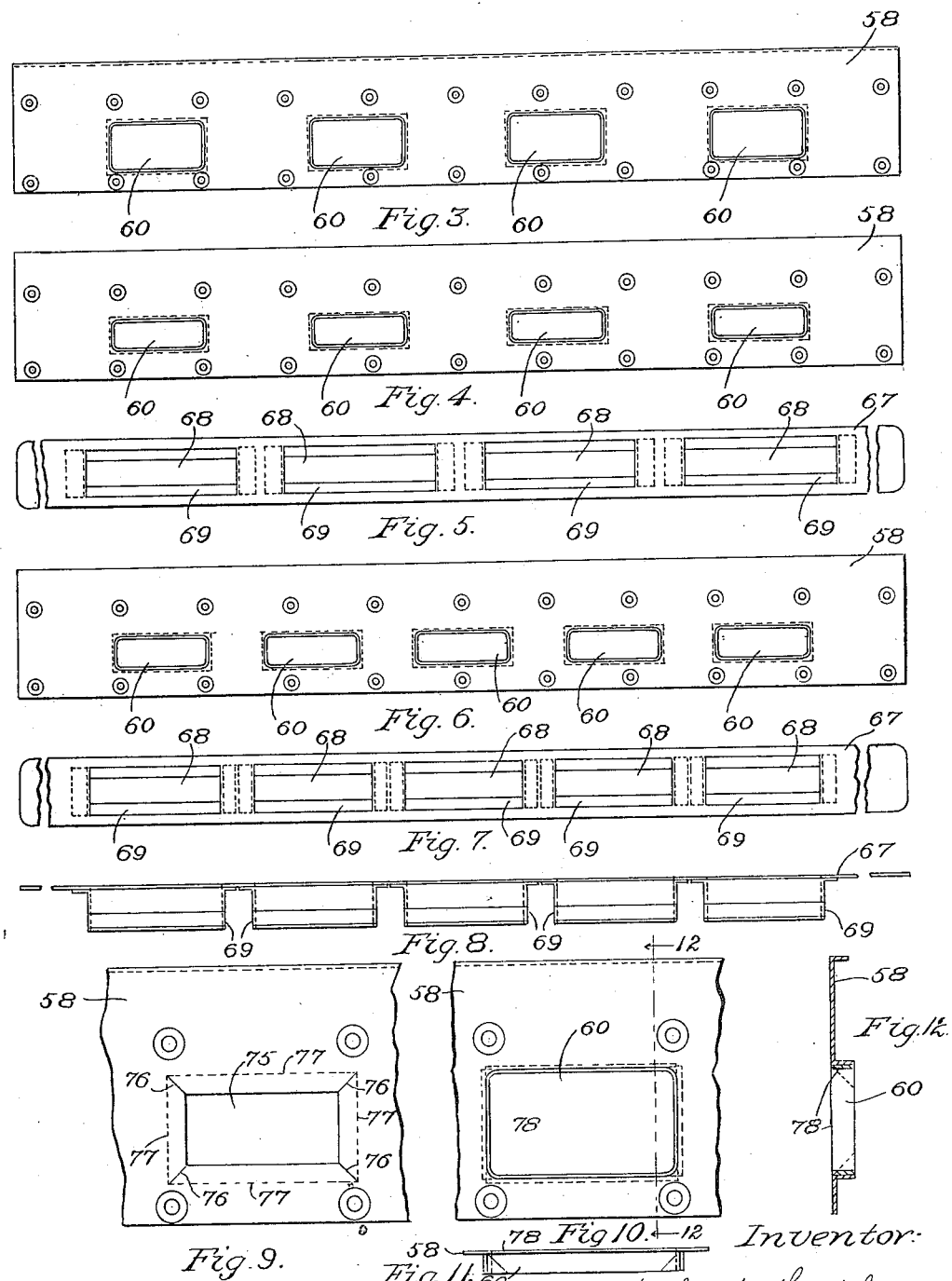

1,708,062

UNITED STATES PATENT OFFICE.

WILLIS N. HARTSHORN, OF RACINE, WISCONSIN, ASSIGNOR TO RACINE CONFECTIONERS' MACHINERY COMPANY, OF RACINE, WISCONSIN, A CORPORATION OF WISCONSIN.

CANDY-MAKING MACHINE.

Application filed August 1, 1923. Serial No. 655,048.

The present invention relates to candy making machines in which a series of molds are carried on a conveyor through the machine and during their progress therethrough receive the materials which go to make up the finished product, such as chocolate nut bars. The machine of the present invention is of the type in which nuts or other articles are first fed into the molds from a hopper, chocolate or other confection being fed in a fluid or a semi-fluid state to the molds after the nuts have been placed therein. The molds then pass over a shaking table and the nuts rise to the surface of the confection and become coated with chocolate.

One of the objects of my invention is to provide, in a machine of this character, new and improved mechanism for measuring the quantity of nuts which are fed to the molds which consists of a slide or valve suitably mounted on a part of the frame of the machine below the nut hopper. This slide is reciprocated so that a removable measuring plate secured thereto is alternately moved from a position below the nut hopper to a position removed therefrom. The quantity of nuts is measured by pockets in the measuring plate and the same discharged from spouts which depend below the reciprocating slide and whose ends terminate adjacent the top of the molds on the conveyor.

A further object of my invention is to provide a rotatable brush, so positioned with respect to the nut hopper and reciprocating slide as to prevent more than a predetermined quantity of nuts being carried from the hopper by the pockets in the slide, the said brush being vertically adjustable with respect to the slide. I also provide removable and interchangeable measuring plates for the reciprocating slide and removable spout plates to be used therewith. The removable measuring plates have pockets of a size and number to measure different quantities of nuts according to the size and number of the impressions in the molds, and the removable spout plates are provided with spouts of a size and number corresponding to the size and number of the pockets in the measuring plates and serve to guide the nuts into the said impressions in the molds.

Still another object of my invention is to prevent the nuts from rebounding out of the impressions in the molds when they are being fed thereto. I accomplish this result by providing the ends of the spouts with laterally projecting flanges which, together with the spouts, completely cover the impressions in the molds.

The foregoing and other objects of the invention, together with the means whereby the same may be carried into effect, will best be understood from the following description of one form or embodiment thereof, illustrated in the accompanying drawings. It will be understood, however, that I do not limit myself to the particular construction described and shown, the same having been chosen for illustrative purposes merely, and that the invention as defined by the claims hereunto appended may be otherwise practiced without departure from its spirit and scope.

In said drawings:

Fig. 1 is a side elevation of the machine showing the arrangement of the several parts including the nut hopper and the device for feeding chocolate to the molds.

Fig. 2 is an enlarged side elevation, partly in section, showing the molds on the conveyor, the nut hopper and measuring and feeding mechanism.

Fig. 3 is a plan view of one of my removable measuring plates.

Fig. 4 is a similar view showing a measuring plate having openings smaller in size.

Fig. 5 is a plan view of one of my removable spout plates.

Fig. 6 is a plan view of a measuring plate having a different number of openings therein.

Fig. 7 is a similar view showing a spout plate adapted to be used with the measuring plate shown in Fig. 6.

Fig. 8 is a side elevation of the spout plate shown in Fig. 7.

Figs. 9 to 12 are enlarged detail views showing the several steps in the construction of the pockets in the measuring plates.

Referring to Fig. 1, the frame 11 of the machine carries a conveyor 12 which passes under the nut hopper 13 and the chocolate depositor 14. The conveyor 12 is provided with projections A to engage the molds 15 (Fig. 2) and carry the same therewith. Suitable mechanism, not shown, moves the conveyor in the direction of the arrow, Fig. 1, in a substantially rectilinear path from one end of the machine to the other by a step by step or intermittent motion.

The nut hopper 13 is supported from the frame 11 of the machine, over the conveyor 12, on uprights 16, one of which is broken away in Figs. 1 and 2. The uprights 16 are supported on spacers 18 and 19 and fastened thereto by studs 17, the spacers 18 and 19 being secured to the main frame 11 by screws 20. The uprights 16, and consequently the hopper 13, may be adjusted longitudinally of the frame 11 by means of the tapped adjustment holes 21 in the spacer 18. Spacers of different thickness can be substituted for those shown to raise or lower the hopper and its associated parts as a unit to provide suitable clearance for the molds as they pass under the spouts 69, hereinafter described. Molds 15 of varying thickness, having impressions therein of varying depths, can thus be used.

The hopper 13 extends the entire width of the machine and has an opening 22 on its lower side from which the nuts are discharged to the measuring mechanism. The opening 22 is partially closed by a plate 23 which extends rearwardly of the opening 22 and is secured to the forward side 25 of the hopper by means of bolts 24. The side 25 of the hopper terminates short of the slide 26, leaving a forward opening 27, extending the width of the hopper, which is closed by a rotatable brush 28. The brush 28 extends transversely of the hopper 13 and is mounted on a shaft 29, which is journalled in vertically adjustable brackets 30 secured to the nut hopper 13. A gear 31 on the brush shaft 29 meshes with a gear 32 on the shaft 33. The shaft 33 is journalled in a bracket 34 mounted on one of the brackets 30, and has a suitable pulley 35 keyed to one end which is connected to the shaft 36, (see Fig. 1), by means of a belt 37. The shaft 36 is driven through the medium of its connection by a gear 38 thereon with a gear 39 on the shaft 40, the gear 39 meshing with a gear 41 on the crank shaft 42. The brush 28 rotates in the direction of the arrow shown in Fig. 2 and serves a purpose hereafter described.

The slide 26 is supported and reciprocated on the bed plate 43. The bed plate 43 is mounted on the brackets 10 and the brackets 66 which extend laterally from the uprights 16. The slide 26 extends the entire width of the hopper 13 and is adapted to be reciprocated below the said hopper by mechanism now to be described. The slide 26 is provided at one end with two ears 44, one on each side of the said slide. A lever 45 is keyed to a shaft 46, journalled in the sides of the hopper 13 and extending transversely through the said hopper. The opposite end of the shaft 46 has a like lever 45, not shown, keyed thereon. The levers 45 are forked at their lower ends, providing a sliding engagement with suitable lateral projections on the ears 44 of the slide 26. An adjustable rod 48 pivoted at 47 to one of the levers 45 is itself pivoted by means of a rod clamp 52 to one arm 51 of a bell crank 49; the latter being pivoted to a bracket 50 on the chocolate depositor 14. The rod clamp 52 can be adjusted longitudinally of the rod 48, thereby changing the position of the slide 26 with respect to the hopper and its associated parts. The arm 54 of the bell crank 49 is connected by an adjustable link 55 to an eccentric strap 56 attached to the opposite end of the link 55, the strap 56 being actuated by an eccentric 57 on the shaft 40. The shaft 40 is driven from the crank shaft 42 by the gears 39 and 41 on the said shafts.

The slide 26 is provided, adjacent its forward end, with a laterally extending opening 65 in which a removable measuring plate 58 is secured by screws 59. The measuring plate 58 has a series of pockets 60 arranged transversely of the said plate. The pockets 60 are of a size and number to be used with molds 15 having impressions therein of a size and number to correspond therewith. In Figs. 3, 4 and 6 I have shown three measuring plates 58 having pockets of different size and number, the plate shown in Fig. 3 having four pockets of greater width than those shown in Fig. 4, and the measuring plate shown in Fig. 6 having five pockets, this plate being adaptable for use with a mold having five impressions abreast. As shown in Figs. 9 to 12, the pockets 60 in the measuring plates 58, are made by cutting openings 75 therein, then cutting along the lines 76 and thereafter bending the plate along the lines 77. The members 78 are then inserted in the openings 75 and are soldered in place.

The bed plate 43 upon which the slide reciprocates is provided with an opening 80, the opening 80 being located at a point removed from the opening 22 in the hopper 13. The brackets 66 support the removable spout plate 67 in the opening 80 in the bed plate 43, the spout plate 67 being of the same thickness as the bed plate 43 so as to be flush with the upper edge thereof and also adapted to be slid endwise onto said brackets from the side of the machine. The spout plate 67 has a series of openings 68 of size and number corresponding to the size and number of the pockets 60 in the measuring plate 58, it being understood that each measuring plate 58 has a spout plate 67 to be used therewith. The spout plate 67 is provided with spouts 69 which depend below the plate 67 and terminate a short distance above the molds 15 on the conveyor 12. The spouts 69 are provided with members 70 at the ends of the said spouts on their forward and rear sides. Laterally extending flanges 71 on the members 70 serve to complete the covering of the impressions in the molds 15, and prevent the nuts from rebounding from the said impressions when they are fed thereto.

In operation the hopper 13 is filled, at least partially full, with nuts. The weight of the nuts will cause a continuous quantity thereof to drop onto the slide 26 through the opening 22 in the hopper 13. The plate 23 prevents an undue quantity of nuts being fed onto the said slide and also deflects the nuts to the rear side of the hopper 13. The slide 26 is reciprocated so that the pockets 60 in the measuring plate 58 are moved from a position beneath the opening 22 in the hopper 13 to a position in registration with the openings 68 in the spout plate 69. Upon each reciprocation of the slide 26 the pockets 60 will receive a quantity of the nuts, and when the slide is moved forwardly the pockets 60 pass beneath the rotating brush 28 and any excess of nuts is removed therefrom due to the rotation of the brush 28. The brush 28 will brush back the excess quantity of nuts toward the opening 22 in the hopper, from where they will be taken upon a later reciprocation of the slide 26. It will be understood that the vertical adjustability of the brush 28 provides a ready means for leveling the nuts even with the top of the slide and thereby accurately determining the quantity of nuts which will be carried by each pocket 60 and deposited in the mold. When the pockets 60 in the measuring plate 58 arrive at the openings 68 in the spout plate 67, the nuts in the said pockets descend through the said openings and are guided in their descent by the spouts 69 to the several impressions in the molds 15, the flanges 71 on the ends of the spouts 69 serving to prevent the nuts from rebounding out of the said impressions in the molds.

What I claim is:

1. In a machine of the character described, feeding and measuring mechanism comprising a hopper having a discharge opening, a plate extending from one side of said hopper and partially closing said opening, a horizontal bed plate below said hopper, said bed plate having openings therein at a point removed from the hopper, a slide on said bed plate having openings therethrough, means to reciprocate the slide to bring the openings in the slide from a position below the discharge opening in the hopper to a position in registration with the holes in the bed plate, and a brush adjacent said side of said hopper to prevent more than a predetermined amount of the contents of the hopper being removed therefrom at each reciprocation of the slide.

2. In a machine of the character described, the combination with a hopper having a discharge opening therein, of a reciprocating slide, said slide having openings therein, a brush rotatable on an axis transverse to the slide and adjustable with respect to the slide to prevent more than the desired quantity of the contents of the hopper being carried by the slide past the said brush, and means for rotating said brush.

3. In a machine of the character described, feeding and measuring mechanism comprising a hopper and a reciprocating slide, said slide having a removable measuring plate secured thereto and provided with a series of openings therethrough of predetermined size, and means to reciprocate the slide to bring the openings in the measuring plate from a position below the hopper to a position removed therefrom.

4. In a machine of the character described having a hopper, the combination with a reciprocating slide having a removable measuring plate secured thereto and provided with a series of openings therein, of a removable spout plate at a position removed from the hopper having a series of openings therein to correspond with the openings in the measuring plate, spouts secured to the said spout plate beneath the openings therein and means to reciprocate the slide to bring the openings in the measuring plate from a position below the hopper to a position in registration with the openings in the spout plate.

5. In a machine of the character described having a hopper, the combination with a slide beneath the hopper, said slide having a removable measuring plate secured thereto and provided with openings therein, of a removable discharge plate beneath said slide having a series of discharge openings spaced laterally from the hopper and corresponding with the openings in the measuring plate, and means to operate the slide to bring the openings in the measuring plate from a position below the hopper to a position in registration with the openings in the discharge plate.

6. In a machine for depositing nuts or similar articles in molds, a hopper, means for moving a series of molds in a substantially rectilinear path through the machine, a reciprocable slide having measuring openings for conveying nuts from the hopper to the spout, and a spout to guide the said nuts to the molds, said spout having flanges at its free end to prevent the said nuts from rebounding out of the said molds as they are fed thereto.

7. In a machine for depositing nuts or similar articles in molds, the combination with means for moving a series of molds in a substantially rectilinear path from one end of the machine to the other, of feeding and measuring mechanism comprising a hopper having a discharge opening, a horizontal bed plate below said hopper, a slide on said bed plate having a removable measuring plate secured thereto and provided with a series of openings therethrough, a removable spout plate secured to the bed plate at a point removed from the hopper and having a series of openings therein corresponding with the openings in the measuring plate and provided with spouts leading from said openings for feeding the said nuts in the hopper to the molds and flanges on the ends of said spouts to prevent the said nuts from rebounding out of said molds as they are fed thereto.

In testimony whereof I affix my signature.

WILLIS N. HARTSHORN.